(12) United States Patent
Uozumi

(10) Patent No.: US 10,298,427 B2
(45) Date of Patent: May 21, 2019

(54) DC-DC CONVERTER AND WIRELESS COMMUNICATION DEVICE INCLUDING THE SAME

(71) Applicant: Renesas Electronics Corporation, Tokyo (JP)

(72) Inventor: Toshiya Uozumi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 118 days.

(21) Appl. No.: 15/480,014

(22) Filed: Apr. 5, 2017

(65) Prior Publication Data

US 2017/0346666 A1 Nov. 30, 2017

(30) Foreign Application Priority Data

May 24, 2016 (JP) ................................. 2016-103181

(51) Int. Cl.
| | |
|---|---|
| *H02M 1/08* | (2006.01) |
| *H02M 1/12* | (2006.01) |
| *H02M 3/158* | (2006.01) |
| *H04L 27/14* | (2006.01) |
| *H02M 1/088* | (2006.01) |

(52) U.S. Cl.
CPC .............. *H04L 27/14* (2013.01); *H02M 1/08* (2013.01); *H02M 1/12* (2013.01); *H02M 3/158* (2013.01); *H02M 1/088* (2013.01)

(58) Field of Classification Search
CPC ...... H02M 3/158; H02M 3/1588; H02M 1/08; H02M 1/12; H02M 1/088; H04L 27/14
See application file for complete search history.

(56) References Cited

U.S. PATENT DOCUMENTS

| | | | | |
|---|---|---|---|---|
| 6,038,431 | A * | 3/2000 | Fukutani | H03J 1/005 375/316 |
| 7,301,400 | B1 | 11/2007 | Dening | |
| 7,804,258 | B2 * | 9/2010 | Zhao | H05B 33/0812 315/185 R |
| 2010/0066320 | A1 * | 3/2010 | Dasgupta | G05F 1/56 323/273 |

(Continued)

OTHER PUBLICATIONS

Wu et al., "Design of a PWM multiple switch control and high efficiency current mode DC to DC boost converter for portable devices," 2014 International Conference on Information Science, Electronics and Electrical Engineering, Sapporo, 2014, pp. 1408-1411.*

(Continued)

*Primary Examiner* — Michelle M Koeth
(74) *Attorney, Agent, or Firm* — McGinn IP Law Group, PLLC.

(57) ABSTRACT

To provide a DC-DC converter capable of reducing noise and a wireless communication device including the same, the DC-DC converter according to an embodiment includes a pulse signal generation unit generating a pulse signal, a voltage conversion unit that has a switch portion provided between an input terminal and an output terminal and on/off controlled by the pulse signal, and outputs an output voltage obtained by stepping down an input voltage supplied to the input terminal, from the output terminal, and a control circuit that controls a value of a current flowing through the switch portion in an on-state based on a value of the input voltage.

11 Claims, 7 Drawing Sheets

(56) References Cited

U.S. PATENT DOCUMENTS

| | | | |
|---|---|---|---|
| 2015/0002195 A1 | 1/2015 | Eulekirk | |
| 2015/0061613 A1* | 3/2015 | Kondou | H02M 3/158 323/271 |
| 2016/0049860 A1* | 2/2016 | Ihs | H02M 3/158 323/282 |

OTHER PUBLICATIONS

Bathily et al., "Specifications of high-frequency DC/DC converters for battery-operated class-F RF applications," 2012 15th International Power Electronics and Motion Control Conference (EPE/PEMC), Novi Sad, 2012, pp. LS5e.2-1-LS5e.2-6.*

* cited by examiner

DC-DC CONVERTER AND WIRELESS COMMUNICATION DEVICE INCLUDING THE SAME

CROSS-REFERENCE TO RELATED APPLICATIONS

The disclosure of Japanese Patent Application No. 2016-103181 filed on May 24, 2016 including the specification, drawings and abstract is incorporated herein by reference in its entirety.

BACKGROUND

The present invention relates to a DC-DC converter and a wireless communication device including that DC-DC converter, and more particularly relates to a DC-DC converter suitable for reducing noise without increasing a circuit scale and a wireless communication device including that DC-DC converter.

A wireless communication device includes a voltage generation unit mounted therein which generates a voltage supplied to each functional block. In recent years, a DC-DC converter is provided as the voltage generation unit in place of an LDO regulator, in order to achieve low power consumption. However, there are problems that harmonic components (noise) generated because of a switching operation of the DC-DC converter degrade a reception sensitivity of the wireless communication device and degrade suppression of unwanted radiation of transmission.

U.S. Unexamined Patent Application Publication No. 2015/0002195 and U.S. Pat. No. 7,301,400 disclose solutions to these problems.

The configuration disclosed in U.S. Unexamined Patent Application Publication No. 2015/0002195 adjusts a frequency of a switching operation of a charge pump in accordance with an output voltage, thereby optimizing noise generated in the charge pump. However, in the configuration disclosed in U.S. Unexamined Patent Application Publication No. 2015/0002195, the frequency of the switching operation dynamically changes not only in a case where the output voltage changes but also in a case where an input voltage changes. Therefore, it is difficult to optimize the noise in a configuration in which the input voltage changes in a wide range.

On the other hand, the configuration disclosed in U.S. Pat. No. 7,301,400 converts an input voltage to intermediate voltages by using two DC-DC converters, respectively, and thereafter generates an output voltage by synthesizing the intermediate voltages. Phases of intermediate currents respectively output from the two DC-DC converters are shifted by 180 degrees with respect to each other. Due to this phase shift, the amplitude of an output current generated by synthesizing these intermediate currents becomes small, and therefore generation of the harmonic components (noise) can be suppressed.

SUMMARY

However, the configuration disclosed in U.S. Pat. No. 7,301,400 requires a plurality of DC-DC converters, and therefore has a problem of increase of a circuit scale. Other problems and novel features will be apparent from the description of this specification and the accompanying drawings.

According to an embodiment, a DC-DC converter includes a pulse signal generation unit that generates a pulse signal, a voltage conversion unit that has a first switch portion provided between an input terminal and an output terminal and on/off controlled by the pulse signal, and outputs from the output terminal an output voltage obtained by stepping down an input voltage supplied to the input terminal, and a control unit that controls a value of a current flowing through the first switch portion in an on-state based on a value of the input voltage.

According to another embodiment, a DC-DC converter includes a pulse signal generation unit that generates a pulse signal, an inductor coupled at an end to an output terminal, a first switch portion that is provided between an input terminal and another end of the inductor and is on/off controlled by the pulse signal, a second switch portion that is provided between a reference voltage terminal and the other end of the inductor and is on/off controlled by the pulse signal complementarily with respect to the first switch portion, and a control unit that controls a value of a current flowing through the first switch portion in an on-state and a value of a current flowing through the second switch portion in an on-state based on a value of the input voltage supplied to the input terminal.

According to the embodiments, it is possible to provide a DC-DC converter capable of reducing noise without increasing a circuit scale and a wireless communication device including the DC-DC converter.

DETAILED DESCRIPTION

Embodiments are described below, with reference to the drawings. Because the drawings are simplified, a technical scope of the embodiments should not be interpreted narrowly on the basis of the description of the drawings. The same components are labeled with the same reference signs, and redundant description is omitted.

The following embodiments will be described while being divided into a plurality of sections or embodiments, if necessary for the sake of convenience. However, unless otherwise specified, these are not independent of each other, but are in a relation such that one is a modified example, an application example, detailed description, complementary explanation, or the like of a portion or the whole of the other. Further, in the following embodiments, when a reference is made to the number of elements, and the like (including number, numerical value, quantity, range, and the like), the number of elements is not limited to the specific number, but may be equal to, greater than or less than the specific number, unless otherwise specified, or except the case where the number is apparently limited to the specific number in principle, or except for other cases.

Furthermore, in the following embodiments, the constitutional elements (including operation steps, or the like) are not always essential, unless otherwise specified, or except the case where they are apparently considered essential in principle, or except for other cases. Similarly, in the following embodiments, when a reference is made to the shapes, positional relationships or the like of the constitutional elements or the like, it is understood that they include ones substantially analogous or similar to the shapes or the like, unless otherwise specified, or unless otherwise considered apparently in principle, or except for other cases. This also applies to the foregoing numbers and the like (including number, numerical value, quantity, range and the like).

First Embodiment

Figure 1:
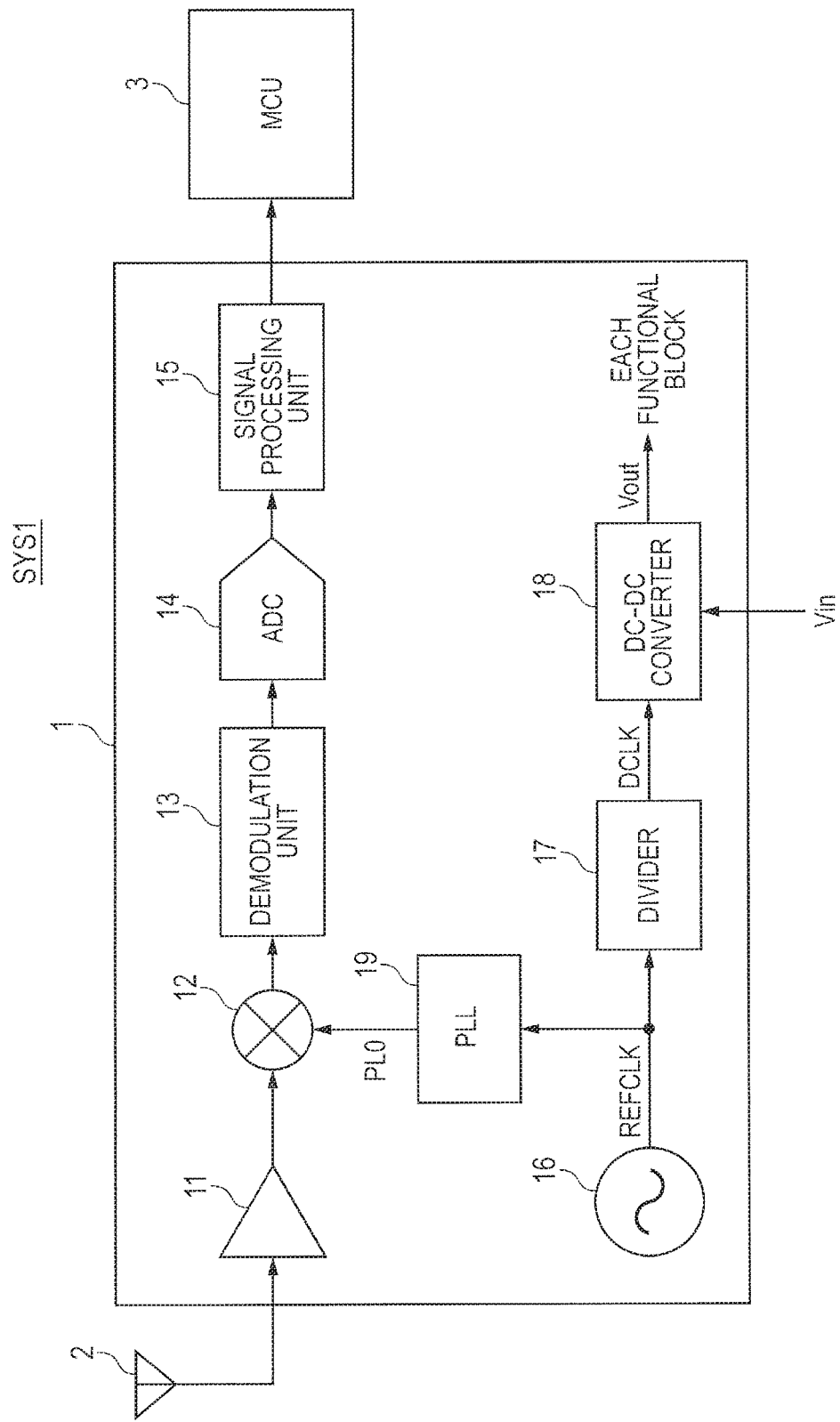
FIG. 1 is a block diagram of a configuration example of a wireless communication system in which a DC-DC converter according to a first embodiment is provided.

FIG. 1 is a block diagram of a configuration example of a wireless communication system SYS1 in which a DC-DC converter according to a first embodiment is provided. The wireless communication system SYS1 is applied to a smart meter, a cellular phone, or an automotive navigation system, for example. The DC-DC converter according to the present embodiment controls a value of a current flowing through a switch portion used for a switching operation when the switch portion is in an on-state, in accordance with a value of an input voltage. Due to this control, the DC-DC converter according to the present embodiment can reduce noise without increasing a circuit scale. As a result, the wireless communication system SYS1 can suppress degradation of a reception sensitivity and can suppress unwanted radiation of a transmission signal, for example. The description is specifically made below.

As illustrated in FIG. 1, the wireless communication system SYS1 includes at least a wireless communication device 1, an antenna 2, and an MCU 3. The wireless communication device 1 is formed on a single semiconductor chip, for example, and includes a low-noise amplifier 11, a mixer 12, a demodulation unit 13, an AD converter 14, a signal processing unit 15, a PLL circuit 19, a reference clock generation unit 16, a divider 17, and a DC-DC converter 18. Although only circuits in a path of reception are illustrated in the wireless communication device 1 in the example of FIG. 1, circuits of a path of transmission may be provided in the wireless communication device 1, of course.

The low-noise amplifier 11 amplifies a high-frequency signal wirelessly received from the outside via the antenna 2, with low noise. The low-noise amplifier 11 may not be provided, if it is not necessary to amplify the high-frequency signal. In the present embodiment, a case where a frequency band of a reception channel is from 923.8 MHz to 924.2 MHz (that is, a center frequency is 924 MHz and a bandwidth is 400 kHz) is described as an example.

The PLL circuit 19 generates a carrier signal PLO based on a reference clock REFCLK generated by the reference clock generation unit 16.

The mixer 12 performs frequency conversion for the high-frequency signal amplified by the low-noise amplifier 11 based on the carrier signal PLO generated by the PLL circuit 19. In other words, the mixer 12 multiplies the carrier signal PLO and the amplified high-frequency signal, thereby converting the amplified high-frequency signal to an intermediate signal. The demodulation unit 13 demodulates the intermediate signal output from the mixer 12 to a baseband signal. The AD converter 14 converts the baseband signal that is analog to a digital baseband signal.

The signal processing unit 15 is a baseband signal processing unit, for example, and performs a predetermined process based on the digital baseband signal.

When receiving a result of the process by the signal processing unit 15, the MCU 3 issues an instruction related to a next process to the wireless communication device 1 or an instruction related to a next process to another peripheral circuit that is not illustrated.

The divider 17 divides the reference clock REFCLK by a division ratio that is in accordance with a control signal S1, and outputs a divided clock DCLK.

The DC-DC converter 18 has a switching-type circuit configuration, and performs a switching operation in synchronization with the divided clock DCLK to generate an output voltage Vout that is obtained by stepping down an input voltage Vin supplied from a power source (not illustrated). The output voltage Vout is supplied to each of functional blocks provided in the wireless communication device 1 (the low-noise amplifier 11, the mixer 12, the demodulation unit 13, the AD converter 14, the signal processing unit 15, the reference clock generation unit 16, the divider 17, the PLL circuit 19, and the like).

Configuration Example of DC-DC Converter 18

Figure 2:
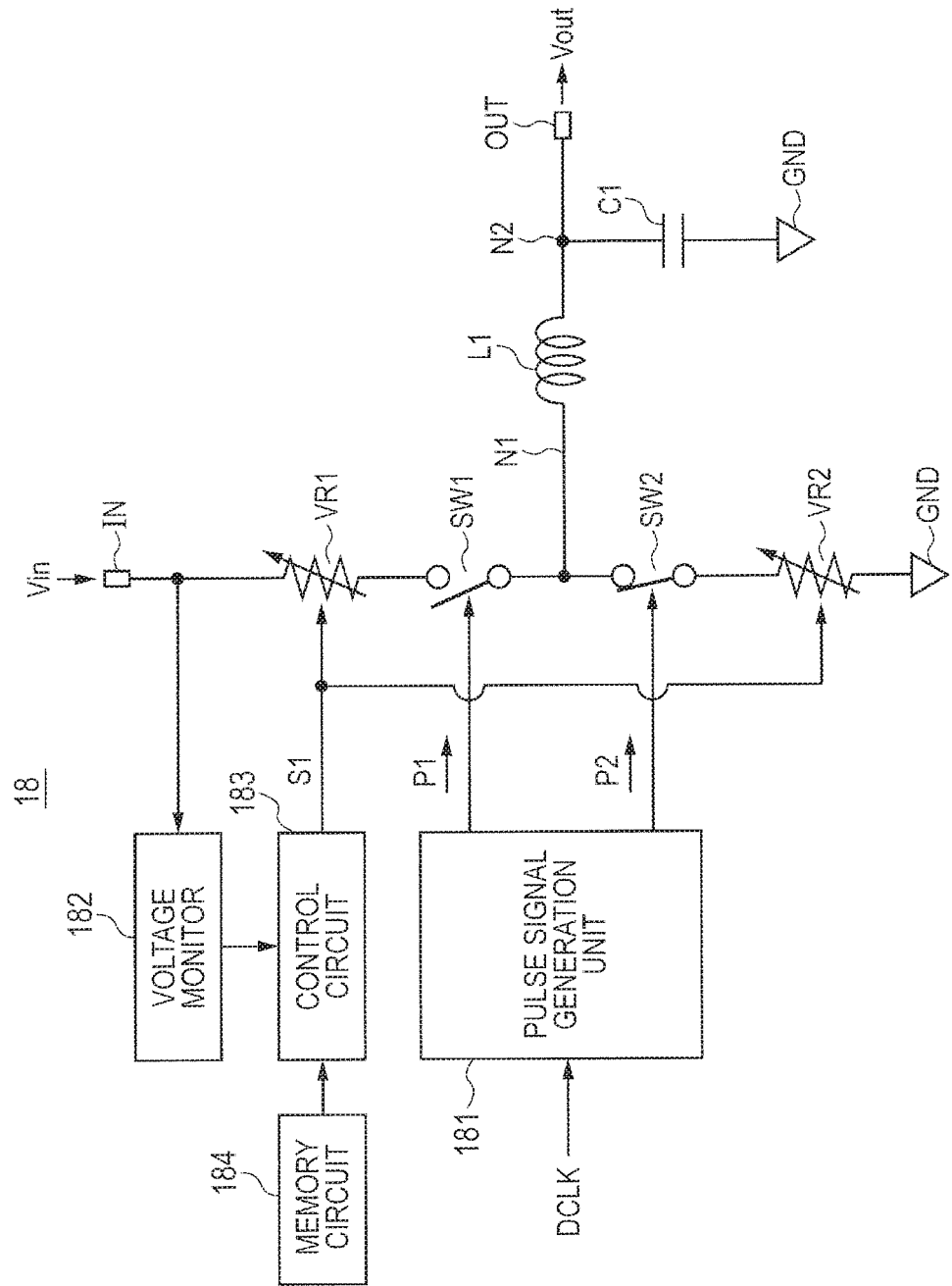
FIG. 2 illustrates a specific configuration example of the DC-DC converter illustrated in FIG. 1.

FIG. 2 is a specific configuration example of the DC-DC converter 18.

As illustrated in FIG. 2, the DC-DC converter 18 includes a pulse signal generation unit 181, a voltage monitor 182, a control circuit (control unit) 183, a memory circuit 184, a switch portion (a first switch portion) SW1, a switch portion (a second switch portion) SW2, a variable resistor VR1, a variable resistor VR2, an inductor L1, and a capacitor C1. Components of the DC-DC converter 18, other than the pulse signal generation unit 181, the voltage monitor 182, the control circuit 183, and the memory circuit 184, constitute a voltage conversion unit.

The pulse signal generation unit 181 outputs pulse signals P1 and P2 each having a predetermined frequency in accordance with the frequency of the divided clock DCLK output from the divider 17 and a pulse width in accordance with the output voltage Vout. The pulse signals P1 and P2 change in the same manner.

For example, the pulse width of the pulse signals P1 and P2 becomes narrow (an on-period of the switch portion SW1 becomes short) when the output voltage Vout exceeds a desired voltage, and becomes wide (the on-period of the switch portion SW1 becomes long) when the output voltage Vout becomes smaller than the desired voltage. In this manner, the output voltage Vout can be maintained at a desired voltage level.

The switch portion SW1 and the variable resistor VR1 are provided in series between an input terminal IN and one end of the inductor L1 (a node N1). The switch portion SW1 is on/off controlled based on the pulse signal P1. The variable resistor VR1 has a resistance value controlled by the control signal S1 from the control circuit 183. The switch portion SW2 and the variable resistor VR2 are provided in series between a ground voltage terminal (a reference voltage terminal) GND and the node N1. The switch portion SW2 is on/off controlled based on the pulse signal P2 complimentarily with respect to the switch portion SW1 (more preferably, with a dead time therebetween). The variable resistor VR2 has a resistance value controlled by the control signal S1 from the control circuit 183. To the input terminal IN is supplied the input voltage Vin from the power source (not illustrated). A ground voltage GND is supplied to the ground voltage terminal GND.

The other end of the inductor L1 (a node N2) is coupled to an output terminal OUT. The capacitor C1 is provided between the output terminal OUT and the ground voltage terminal GND.

The voltage monitor 182 monitors a value of the input voltage Vin supplied to the input terminal IN. The memory circuit 184 stores therein information indicating a relation between a value of the input voltage Vin and a resistance value of each of the variable resistors VR1 and VR2 (a value of a current flowing through each of the switch portions SW1 and SW2 in an on-state).

The control circuit 183 reads out information on the resistance value of each of the variable resistors VR1 and VR2 corresponding to the value of the input voltage Vin detected by the voltage monitor 182 from the memory circuit 184, and controls the resistance value of each of the variable resistors VR1 and VR2. By this control, the value of the current flowing through each of the switch portions SW1 and SW2 in the on-state is controlled. In other words, a driving capability of each of the switch portions SW1 and SW2 is controlled. The details of a control method by the control circuit 183 will be described later.

Subsequently, a basic operation of the DC-DC converter 18 is described.

First, the switch portion SW1 is turned on and the switch portion SW2 is turned off, so that a current flows from the input terminal IN to the output terminal OUT via the switch portion SW1 and the inductor L1. At this time, a current energy is accumulated in the inductor L1.

Thereafter, the switch portion SW1 is turned off and the switch portion SW2 is turned on, so that the current flowing from the input terminal IN to the inductor L1 via the switch portion SW1 is cut off. The inductor L1 discharges the accumulated current energy to the output terminal OUT to maintain a current value of the current flowing immediately before. Accordingly, a current flows from the ground voltage terminal GND to the output terminal OUT via the switch portion SW2.

The DC-DC converter 18 repeats the above operations to generate the output voltage Vout that is obtained by stepping down the input voltage Vin by a voltage corresponding to a duty ratio of the pulse signals P1 and P2.

The output voltage Vout is fed back to the pulse signal generation unit 181. Then, the pulse signal generation unit 181 makes the duty ratio of the pulse signals P1 and P2 smaller by making the pulse width of the pulse signals P1 and P2 narrower when the output voltage Vout is larger than a desired voltage, and makes the duty ratio of the pulse signals P1 and P2 larger by making the pulse width of the pulse signals P1 and P2 wider when the output voltage Vout is smaller than the desired voltage. Due to this, the output voltage Vout is made stable at the desired voltage.

The wireless communication device 1 can make a current flow intermittently from the power source to the DC-DC converter 18 by using the DC-DC converter 18. Therefore, increase of power consumption can be suppressed, as compared with a case of using an LDO regulator, for example.

(Details of Control Method by Control Circuit 183)

Next, the details of a method for controlling a value of a current flowing through each of the switch portions SW1 and SW2 in an on-state by the control circuit 183 are described.

Figure 3:
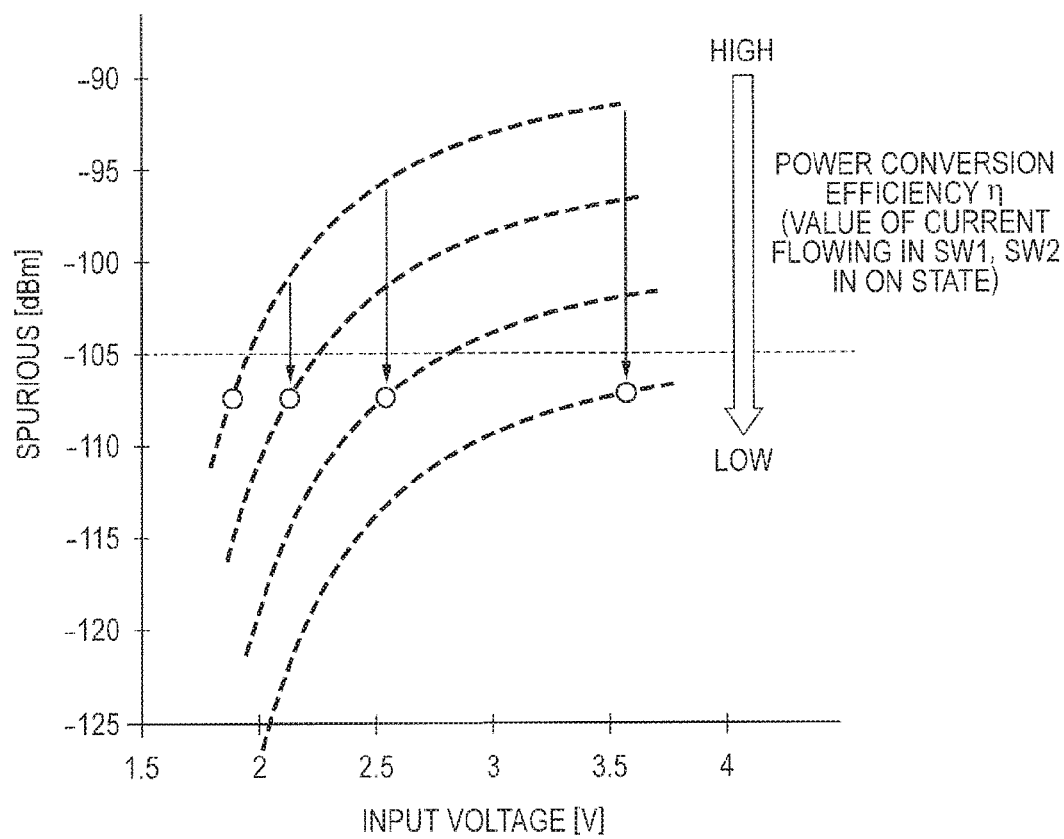
FIG. 3 illustrates a relation between an input voltage and a spurious in the DC-DC converter illustrated in FIG. 1.

FIG. 3 illustrates a relation between the input voltage Vin in the DC-DC converter 18 and a spurious in a band of a reception signal. In FIG. 3, the horizontal axis represents the input voltage Vin and the vertical axis represents the spurious. In the present embodiment, a case is described as an example, in which it is required to suppress the spurious that is noise component to be less than −105 dBm in order to prevent degradation of a reception sensitivity of the wireless communication device 1 and degradation of suppression of unwanted radiation of a transmission signal.

As illustrated in FIG. 3, in a case where a value of a current flowing through the switch portion SW1, SW2 in an on-state is constant (a case where the driving capability of the switch portion SW1, SW2 is constant), ringing caused by rising of the output voltage Vout becomes larger as the input voltage Vin becomes larger, and therefore the spurious increases. Also, as the input voltage Vin becomes smaller, the ringing caused by rising of the output voltage Vout becomes slammer and therefore the spurious decreases.

Further, as the value of the current flowing through the switch portion SW1, SW2 in the on-state becomes larger (the driving capability of the switch portion SW1, SW2 is larger), the ringing caused by rising of the output voltage Vout becomes larger and therefore the spurious increases. On the other hand, as the value of the current flowing through the switch portion SW1, SW2 in the on-state becomes smaller (the driving capability of the switch portion SW1, SW2 becomes smaller), the ringing caused by rising of the output voltage Vout is smaller and therefore the spurious decreases.

Assuming that power consumption of the power source is Pin, power consumption of the wireless communication device 1 is $P_{RF}$, and a power conversion efficiency of the DC-DC converter 18 is $\eta$, a relation represented by the following Expression (1) is established. It can be said that in a case where other power consumption is constant, the power conversion efficiency $\eta$ becomes higher as the value of the current flowing through the switch portion SW1, SW2 in the on-state (the driving capability of the switch portion SW1, SW2) becomes higher.

$$Pin = \frac{P_{RF}}{\eta} \qquad (1)$$

Assuming that a value of a voltage supplied to the input terminal IN is Vin and a value of a current flowing through the input terminal IN is Iin, Pin=Iin×Vin. Therefore, a relation represented by the following Expression (2) is established from Expression (1).

$$Iin = \frac{P_{RF}}{\eta \cdot Vin} \qquad (2)$$

In order to achieve long life of the power source, it is desirable that the current value Iin is as small as possible. In the present embodiment, a case where the magnitude of the current value Iin except for its unit is required to be less than 1.00 $P_{RF}$ is described as an example.

As is found from Expression (2), the current value Iin becomes larger with decrease of the voltage value Vin. Therefore, when the voltage value Vin is small, it is necessary to set the power conversion efficiency η to be higher so that the current value Iin becomes less than a desired value 1.00 $P_{RF}$. In other words, it is necessary to increase the value of the current flowing through the switch portion SW1, SW2 in the on-state.

For example, in a case where the power conversion efficiency η is 0.5, when the voltage value Vin drops from 3.6 V to 1.8 V, the current value Iin increases from about 0.56 $P_{RF}$ to about 1.11 $P_{RF}$ as represented in Expressions (3) and (4). That is, in the case where the power conversion efficiency η is 0.5 and the voltage value Vin is 1.8 V, the current value Iin cannot be suppressed to be less than the desired value 1.00 $P_{RF}$. Therefore, when the voltage value is as low as 1.8 V, the power conversion efficiency η is changed from 0.5 to 0.9, for example. In other words, the value of the current flowing through the switch portion SW1, SW2 in the on-state is increased. Due to this change, the current value Iin can be suppressed to be less than the desired value 1.00 $P_{RF}$, that is, about 0.62 $P_{RF}$, as represented in Expression (5).

$$Iin = \frac{P_{RF}}{\eta \cdot Vin} = \frac{P_{RF}}{0.5 \cdot 3.6\,V} \approx 0.56 P_{RF} \quad (3)$$

$$Iin = \frac{P_{RF}}{\eta \cdot Vin} = \frac{P_{RF}}{0.5 \cdot 1.8\,V} \approx 1.11 P_{RF} \quad (4)$$

$$Iin = \frac{P_{RF}}{\eta \cdot Vin} = \frac{P_{RF}}{0.9 \cdot 1.8\,V} \approx 0.62 P_{RF} \quad (5)$$

Meanwhile, as is found from Expression (2), the current value Iin becomes smaller with increase of the voltage value Vin. Therefore, when the voltage value Vin is high, the current value Iin is suppressed to be less than the desired value 1.00 $P_{RF}$ irrespective of the power conversion efficiency η.

However, as illustrated in FIG. 3, when the voltage value Vin is high and the power conversion efficiency η is high, the spurious increases to a desired value −105 dBm or more. Therefore, when the voltage value Vin is high, the power conversion efficiency η is set to be low so that the spurious becomes less than the desired value −105 dBm. In other words, the value of the current flowing through the switch portion SW1, SW2 in the on-state is reduced.

For example, when the voltage value Vin is 3.6 V, the power conversion efficiency η is changed from 0.9 to 0.5. Due to this change, it is possible to suppress the spurious to be less than the desired value −105 dBm even when the voltage value Vin is high. In addition, when the voltage value Vin is as high as 3.6 V, the current value Iin can be suppressed to be less than the desired value 1.00 $P_{RF}$, that is, about 0.56 $P_{RF}$ even when the power conversion efficiency η is lowered to 0.5, as represented in Expression (3).

In addition, whether the voltage value Vin is 3.6 V or not, in a case where the spurious is the desired value −105 dBm or more, it is possible to suppress the spurious to be always less than the desired value −105 dBm by making the power conversion efficiency η lower (that is, reducing the value of the current flowing through the switch portion SW1, SW2 in the on-state), as illustrated in FIG. 3. Due to this, the wireless communication system SYS1 can suppress degradation of a reception sensitivity and can suppress unwanted radiation of a transmission signal.

As described above, the DC-DC converter 18 according to the present embodiment controls the value of the current flowing through the switch portion SW1, SW2 used for a switching operation when the switch portion is in the on-state, in accordance with the value of the input voltage Vin. Therefore, the DC-DC converter 18 according to the present embodiment can reduce noise without increasing a circuit scale. Accordingly, the wireless communication system SYS1 can suppress degradation of a reception sensitivity and can suppress unwanted radiation of a transmission signal, for example.

In a case where an integral multiple of the frequency of the pulse signals P1 and P2 is not included in the frequency band of the high-frequency signal wirelessly received from the outside, noise generated from the DC-DC converter 18 does not degrade the reception sensitivity. In this case, the control circuit 183 performs control in such a manner that the value of the current flowing through the switch portion SW1, SW2 in the on-state becomes maximum. This control makes the power conversion efficiency η higher, so that increase of unwanted power consumption can be suppressed.

Although a case where the switch portion SW2 is provided is described in the present embodiment as an example, the configuration is not limited thereto. For example, in place of the switch portion SW2, a diode may be provided of which an anode is provided on the ground voltage terminal GND side and a cathode is provided on the node N1 side.

First Specific Configuration Example of Switch Portions SW1 and SW2 and Variable Resistors VR1 and VR2

Figure 4:
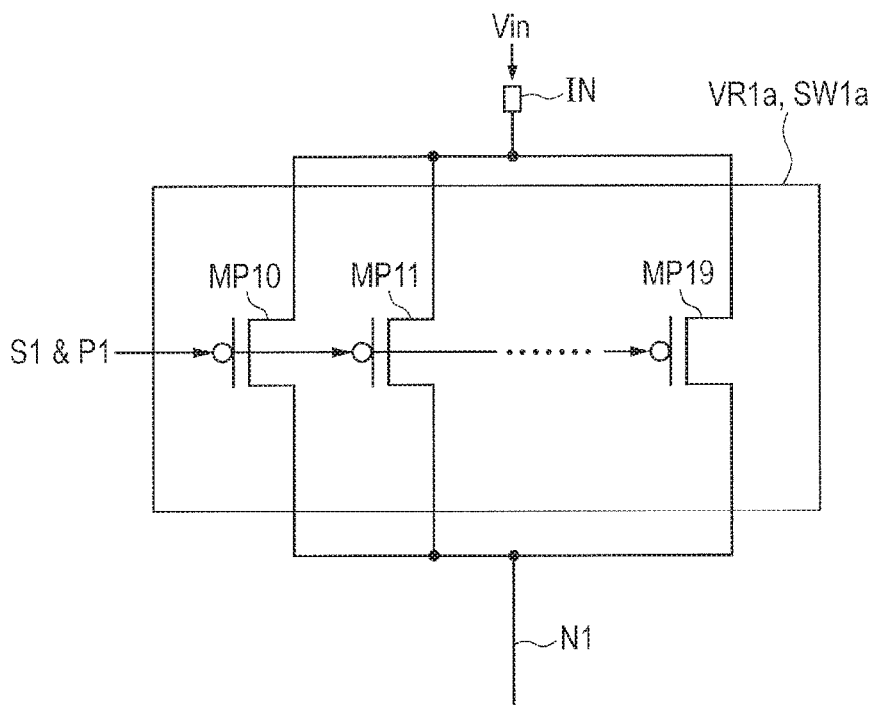
FIG. 4 illustrates a first specific configuration example of a switch portion SW1 and a variable resistor VR1 provided in the DC-DC converter illustrated in FIG. 1.

FIG. 4 illustrates a first specific configuration example of the switch portion SW1 and the variable resistor VR1 provided in the DC-DC converter 18, which are illustrated as a switch portion SW1a and a variable resistor VR1a, respectively.

In the example of FIG. 4, P-channel MOS transistors (hereinafter, simply referred to as transistors) MP10 to MP19 are provided in parallel between the input terminal IN and the node N1, as the switch portion SW1a and the variable resistor VR1a. The transistors MP10 to MP19 coupled in parallel have a function of each of the switch portion SW1a and the variable resistor VR1a.

All of the transistors MP10 to MP19 are on/off controlled based on the control signal S1 and the pulse signal P1. More specifically, the number of ones of the transistors MP10 to MP19, which are fixed to be in an off-state, is controlled by the control signal S1, and each transistor that is not fixed to be in the off-state is on/off controlled by the pulse signal P1.

Figure 5:
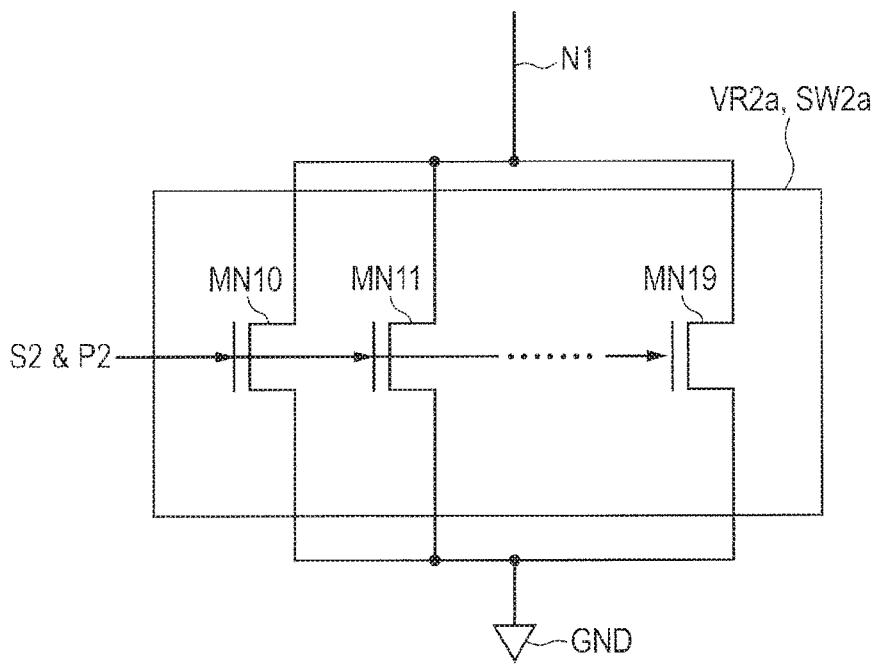
FIG. 5 illustrates a first specific configuration example of a switch portion SW2 and a variable resistor VR2 provided in the DC-DC converter illustrated in FIG. 1.

FIG. 5 illustrates a first specific configuration example of the switch portion SW2 and the variable resistor VR2 provided in the DC-DC converter 18, which are illustrated as a switch portion SW2a and a variable resistor VR2a, respectively.

In the example of FIG. 5, N-channel MOS transistors (hereinafter, simply referred to as transistors) MN10 to MN19 are provided in parallel between the ground voltage terminal GND and the node N1, as the switch portion SW2a and the variable resistor VR2a. The transistors MN10 to MN19 coupled in parallel have a function of each of the switch portion SW2a and the variable resistor VR2a.

All of the transistors MN10 to MN19 are on/off controlled based on the control signal S1 and the pulse signal P2. More specifically, the number of ones of the transistors MN10 to MN19, which are fixed to be in an off-state, is controlled by the control signal S1, and each transistor that is not fixed to be in the off-state is on/off controlled by the pulse signal P2.

For example, when the input voltage Vin is larger than a predetermined voltage V1, the number of the transistors of the transistors MP10 to MP19, which are fixed to be in the off-state, is increased based on the control signal S1. In other words, the number of the transistors that are on/off controlled by the pulse signal P1 is decreased based on the control signal S1. Thus, a value of a current flowing through the switch portion SW1a in an on-state becomes smaller. That is, a driving capability of the switch portion SW1a is lowered.

Also, when the input voltage Vin is larger than the predetermined voltage V1, the number of the transistors of the transistors MN10 to MN19, which are fixed to be in the off-state, is increased based on the control signal S1. In other words, the number of the transistors that are on/off controlled by the pulse signal P2 is decreased based on the control signal S1. Thus, a value of a current flowing through the switch portion SW2a in an on-state becomes smaller. That is, a driving capability of the switch portion SW2a is lowered.

As a result, the spurious is suppressed to be less than a desired value (for example, −105 dBm) and therefore the wireless communication system SYS1 can suppress degradation of a reception sensitivity and can suppress unwanted radiation of a transmission signal.

In addition, when the input voltage Vin is larger than a predetermined voltage V2 that is larger than the predetermined voltage V1, the number of the transistors of the transistors MP10 to MP19, which are fixed to be in the off-state, is further increased and the number of the transistors of the transistors MN10 to MN19, which are fixed to be in the off-state, is also further increased, based on the control signal S1.

On the other hand, when the input voltage Vin is the predetermined voltage V1 or less, the number of the transistors of the transistors MP10 to MP19, which are fixed to be in the off-state, is decreased based on the control signal S1. In other words, the number of the transistors that are on/off controlled by the pulse signal P1 is increased based on the control signal S1. Thus, the value of the current flowing through the switch portion SW1a in the on-state becomes larger. That is, the driving capability of the switch portion SW1a is increased.

Also, when the input voltage Vin is the predetermined voltage V1 or less, the number of the transistors of the transistors MN10 to MN19, which are fixed to be in the off-state, is decreased based on the control signal S1. In other words, the number of the transistors that are on/off controlled by the pulse signal P2 is increased based on the control signal S1. Thus, the value of the current flowing through the switch portion SW2a in the on-state becomes larger. That is, the driving capability of the switch portion SW2a is increased.

As a result, the power conversion efficiency of the DC-DC converter 18 is improved, and therefore the wireless communication system SYS1 can suppress increase of unwanted power consumption.

Furthermore, when the input voltage Vin is smaller than a predetermined voltage V0 that is smaller than the predetermined voltage V1, the number of ones of the transistors MP10 to MP19, which are fixed to be in the off-state, is further decreased and the number of ones of the transistors MN10 to MN19, which are fixed to be in the off-state, is also further decreased, based on the control signal S1.

Although a case where 10 transistors MP10 to MP19 are provided as the switch portion SW1 and the variable resistor VR1 and 10 transistors MN10 to MN19 are provided as the switch portion SW2 and the variable resistor VR2 is described in the present embodiment as an example, the configuration is not limited thereto. The number of the transistors can be changed to a given number.

Second Specific Configuration Example of Variable Resistors VR1 and VR2

Figure 6:
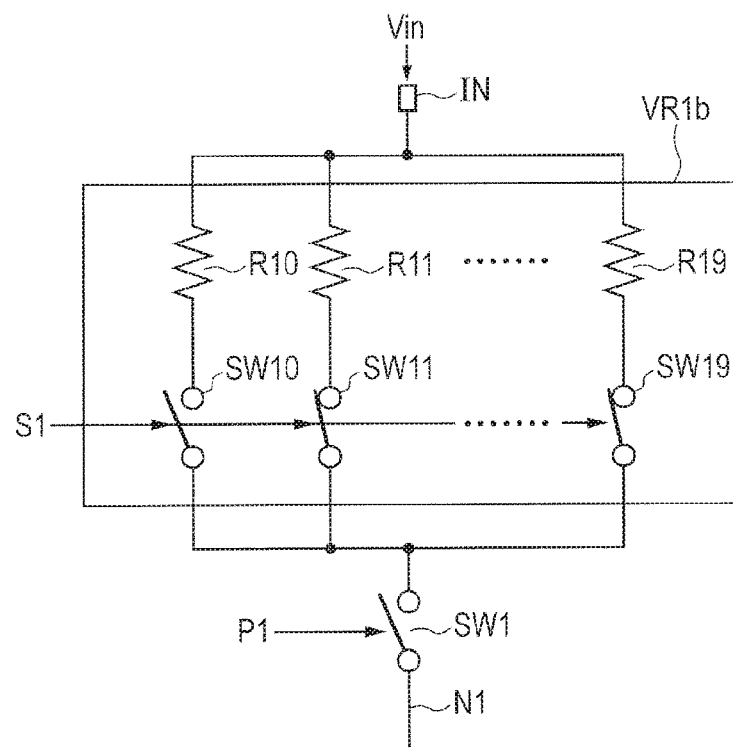
FIG. 6 illustrates a second specific configuration example of the variable resistor VR1 provided in the DC-DC converter illustrated in FIG. 1.

FIG. 6 illustrates a second specific configuration example of the variable resistor VR1 provided in the DC-DC converter 18, which is illustrated as a variable resistor VR1b.

As illustrated in FIG. 6, the variable resistor VR1b includes resistor elements R10 to R19 coupled in parallel and switch elements SW10 to SW19 coupled in series with the respective resistor elements R10 to R19. Resistance values of the resistor elements R10 to R19 are mutually different. In this example, it is assumed that the resistance values gradually become larger from the resistor elements R10 to R19.

The switch elements SW10 to SW19 are all on/off controlled based on the control signal S1. More specifically, it is controlled by the control signal S1 which of the switch elements SW10 to SW19 is turned on.

Figure 7:
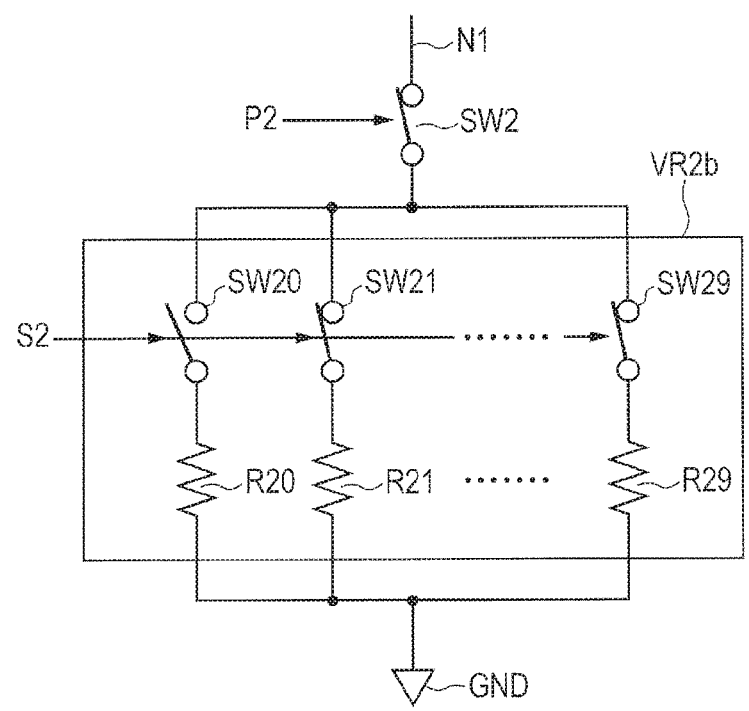
FIG. 7 illustrates a second specific configuration example of the variable resistor VR2 provided in the DC-DC converter illustrated in FIG. 1.

FIG. 7 illustrates a second specific configuration example of the variable resistor VR2 provided in the DC-DC converter 18, which is illustrated as a variable resistor VR2b.

As illustrated in FIG. 7, the variable resistor VR2b includes resistor elements R20 to R29 coupled in parallel and switch elements SW20 to SW29 coupled in series with the respective resistor elements R20 to R29. Resistance values of the resistor elements R20 to R29 are mutually different. In this example, it is assumed that the resistance values gradually become larger from the resistor elements R20 to R29.

The switch elements SW20 to SW29 are all on/off controlled based on the control signal S1. More specifically, it is controlled by the control signal S1 which of the switch elements SW20 to SW29 is turned on.

For example, when the input voltage Vin is larger than the predetermined voltage V1, one of the switch elements SW10 to SW19, which is coupled to a resistor element having a larger resistance value (any of the resistor elements R10 to R19), is selectively turned on based on the control signal S1. This makes the resistance value of the variable resistor VR1b larger, so that the value of the current flowing through the switch portion SW1 in the on-state becomes smaller. That is, the driving capability of the switch portion SW1 is lowered.

Also, when the input voltage Vin is larger than the predetermined voltage V1, one of the switch elements SW20 to SW29, which is coupled to a resistor element having a larger resistance value (any of the resistor elements R20 to R29), is selectively turned on based on the control signal S1. This makes the resistance value of the variable resistor VR2b larger, so that the value of the current flowing through the switch portion SW2 in the on-state becomes smaller. That is, the driving capability of the switch portion SW2 is lowered.

As a result, the spurious is suppressed to be less than a desired value (for example, −105 dBm), and therefore the wireless communication system SYS1 can suppress degradation of a reception sensitivity and can suppress unwanted radiation of a transmission signal.

When the input voltage Vin is larger than the predetermined voltage V2 that is larger than the predetermined voltage V1, one of the switch elements SW10 to SW19, which is coupled to a resistor element having a further larger resistance value, is selectively turned on based on the control signal S1.

On the other hand, when the input voltage Vin is the predetermined voltage V1 or less, one of the switch elements SW10 to SW19, which is coupled to a resistor element having a smaller resistance value (any of the resistor elements R10 to R19), is selectively turned on based on the control signal S1. This makes the resistance value of the variable resistor VR1b smaller, so that the value of the current flowing through the switch portion SW1 in the on-state becomes larger. That is, the driving capability of the switch portion SW1 is increased.

Also, when the input voltage Vin is the predetermined voltage V1 or less, one of the switch elements SW20 to SW29, which is coupled to a resistor element having a smaller resistance value (any of the resistor elements R20 to R29), is selectively turned on based on the control signal S1. This makes the resistance value of the variable resistor VR2b smaller, so that the value of the current flowing through the switch portion SW2 in the on-state becomes larger. That is, the driving capability of the switch portion SW2 is increased.

As a result, the power conversion efficiency of the DC-DC converter 18 is improved, and therefore the wireless communication system SYS1 can suppress increase of unwanted power consumption.

Furthermore, when the input voltage Vin is smaller than the predetermined voltage V0 that is smaller than the predetermined voltage V1, one of the switch elements SW20 to SW29, which is coupled to a resistor element having a further smaller resistance value, is selectively turned on.

In the present embodiment, a case where 10 resistor elements R10 to R19 are provided in the variable resistor VR1 and 10 resistor elements R20 to R29 are provided in the variable resistor VR2 is described as an example. However, the configuration is not limited thereto. The number of the resistor elements provided in each of the variable resistors VR1 and VR2 can be changed to any number.

Second Embodiment

Figure 8:
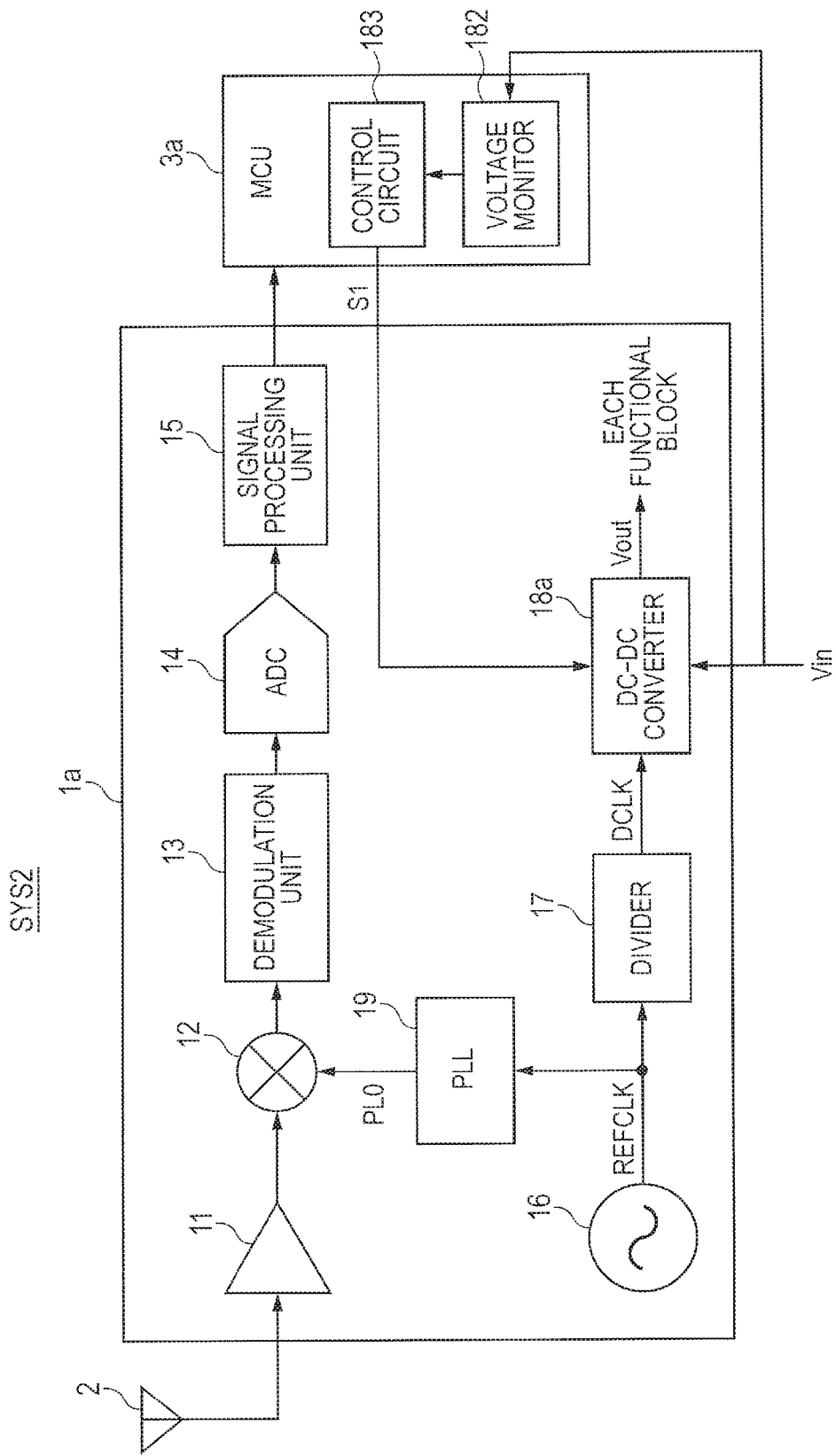
FIG. 8 is a block diagram of a configuration example of a wireless communication system in which a DC-DC converter according to a second embodiment is provided.

FIG. 8 is a block diagram illustrating a wireless communication system SYS2 according to a second embodiment.

As illustrated in FIG. 8, the wireless communication system SYS2 includes a wireless communication device 1a, the antenna 2, and an MCU 3a. The MCU 3a further has a function of each of the voltage monitor 182 and the control circuit 183, as compared with the MCU 3. The wireless communication device 1a includes a DC-DC converter 18a that does not include the voltage monitor 182 and the control circuit 183 in place of the DC-DC converter 18, as compared with the wireless communication device 1. The other portion of the wireless communication system SYS2 has the same configuration as that of the wireless communication system SYS1, and the description thereof is omitted.

The wireless communication system SYS2 according to the present embodiment can achieve the same or similar advantageous effects as/to those of the wireless communication system SYS1. Further, because the wireless communication system SYS2 achieves the function of each of the voltage monitor 182 and the control circuit 183 by using the MCU 3a, the DC-DC converter 18a that is general purpose can be used. Consequently, increase of a manufacturing cost can be suppressed, for example.

Third Embodiment

Figure 9:
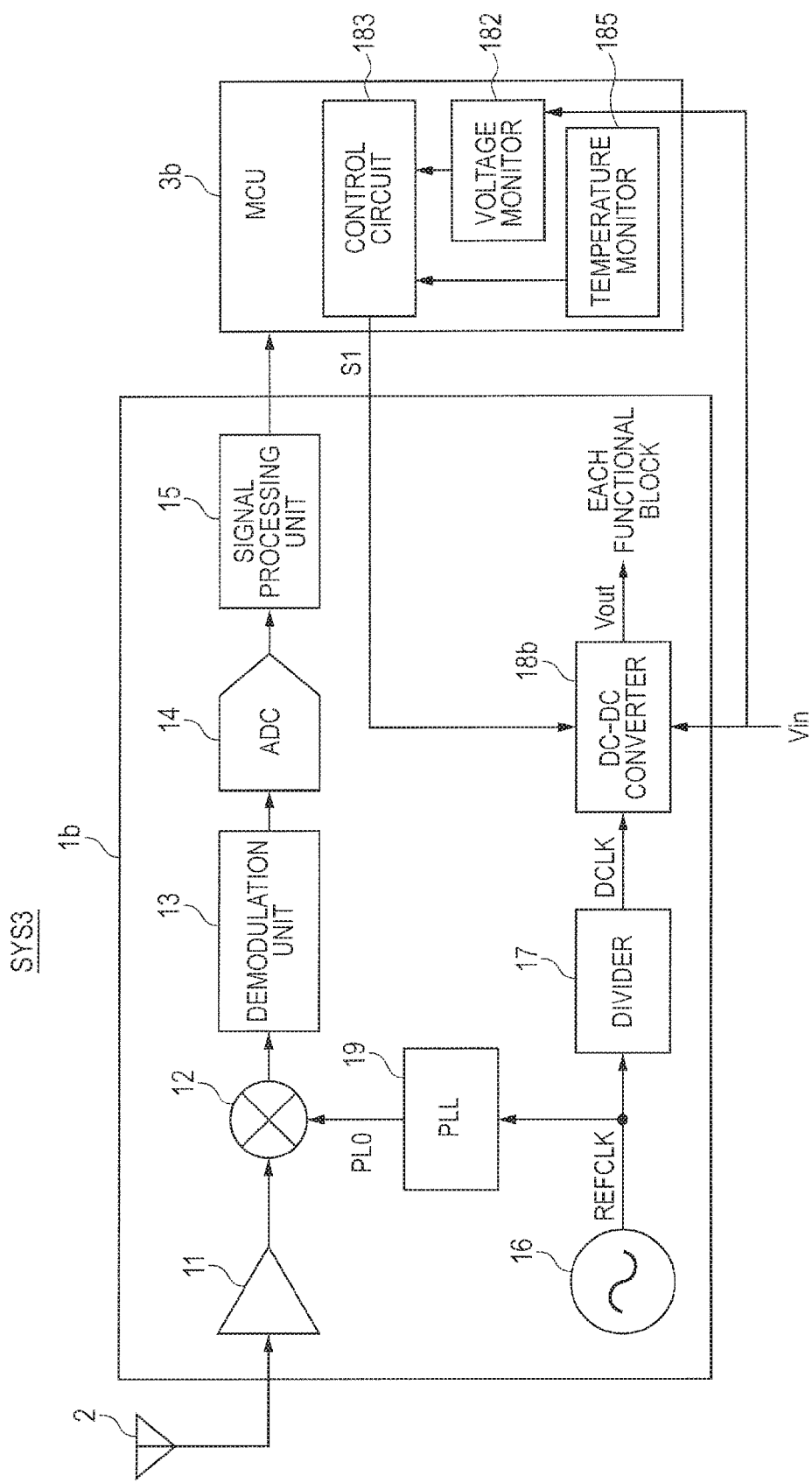
FIG. 9 is a block diagram of a configuration example of a wireless communication system in which a DC-DC converter according to a third embodiment is provided.

FIG. 9 illustrates a wireless communication system SYS3 according to a third embodiment that includes a wireless communication device 1b, the antenna 2, and an MCU 3b. The MCU 3b further has a function of each of the voltage monitor 182, the control circuit 183, and a temperature monitor 185 monitoring an ambient temperature (that is, a temperature of a DC-DC converter), as compared with the MCU 3. The wireless communication device 1b includes a DC-DC converter 18b that does not include the voltage monitor 182 and the control circuit 183, in place of the DC-DC converter 18, as compared with the wireless communication device 1. The other portion of the wireless communication device SYS3 has the same configuration as that of the wireless communication system SYS1, and therefore the description thereof is omitted.

The wireless communication system SYS3 according to the present embodiment can achieve the same or similar advantageous effects as/to the wireless communication system SYS1, Also, because the wireless communication system SYS3 achieves the function of each of the voltage monitor 182 and the control circuit 183 by using the MCU 3b, the DC-DC converter 18b that is general purpose can be used. As a result, increase of a manufacturing cost can be suppressed, for example.

Further, the wireless communication system SYS3 monitors the temperature around the DC-DC converter 18b by means of the temperature monitor 185 and controls a value of a current flowing through the switch portion SW1, SW2 in an on-state based on that detection result. Therefore, it is possible to control the value of the current flowing through the switch portion SW1, SW2 in the on-state with high accuracy even in a case where the value of the current flowing through the switch portion SW1, SW2 in the on-state (specifically, an on-state resistance of a transistor, a resistance value of a resistor element, or the like) is changed by the temperature change. As a result, the wireless communication system SYS3 can suppress degradation of a reception sensitivity and can suppress unwanted radiation of a transmission signal.

In the present embodiment, a case is described as an example, in which the control circuit 183 controls the value of the current flowing through the switch portion SW1, SW2 in the on-state not only based on the result of detection by the voltage monitor 182 but also on the result of detection by the temperature monitor 185. However, the control is not limited thereto. The control circuit 183 may be configured to control the value of the current flowing through the switch portion SW1, SW2 in the on-state not only based on the result of detection by the voltage monitor 182 but also on a result of detection by a process monitor that monitors a variation in a manufacturing process. Alternatively, the control circuit 183 may be configured to control the value of the current flowing through the switch portion SW1, SW2 in the on-state not only based on the result of detection by the voltage monitor 182 but also on the result of detection by each of the process monitor and the temperature monitor 185.

Further, although a case where the function of the temperature monitor 185 is achieved by the MCU 3b is described in the present embodiment as an example, the temperature monitor 185 is not limited thereto. The temperature monitor 185 (and the process monitor) may be provided outside the MCU 3b, for example, in the wireless communication device 1b.

As described above, a DC-DC converter according to each of the above-described first to third embodiments and a wireless communication device including that DC-DC converter control a value of a current flowing through a switch portion SW1, SW2 used for a switching operation when the switch portion is in an on-state, in accordance with a value of an input voltage Vin. Therefore, the DC-DC converter according to each of the above-described first to third embodiments can reduce noise without increasing a circuit scale. As a result, a wireless communication system with the DC-DC converter according to each of the above-described first to third embodiments mounted therein can suppress degradation of a reception sensitivity and can suppress unwanted radiation of a transmission signal.

In the above description, the invention made by the inventors of the present application has been specifically described by way of the embodiments. However, the present invention is not limited to the aforementioned embodiments, and can be changed in various ways within the scope not departing from the gist thereof.

For example, in the DC-DC converter according to each of the above-described embodiments, a conductive type (a p-type or an n-type) of a semiconductor substrate, a semiconductor layer, or a diffusion layer (a diffusion region) may be reversed. Therefore, assuming that one conductive type of the n-type and the p-type is a first conductive type and the other conductive type is a second conductive type, the first conductive type and the second conductive type may be the p-type and the n-type, or the n-type and the p-type, respectively.

What is claimed is:

1. A DC-DC converter comprising:
   a pulse signal generation unit that generates a pulse signal;
   a voltage conversion unit that includes a first switch portion provided between an input terminal and an output terminal and on/off controlled by the pulse signal, and outputs an output voltage obtained by stepping down an input voltage supplied to the input terminal, from the output terminal;
   a control unit that controls a value of a current flowing through the first switch portion in an on-state based on a value of the input voltage;
   a plurality of first resistor elements that are provided in parallel between the input terminal and the output terminal and have mutually different resistance values; and
   a plurality of second resistor elements that are provided in parallel between a reference voltage terminal and the output terminal and have mutually different resistance values,
   wherein the voltage conversion unit includes a second switch portion that is provided between the reference voltage terminal and the output terminal and is on/off controlled by the pulse signal complementarily with respect to the first switch portion,
   wherein the control unit controls the value of the current flowing through the first switch portion in an on-state and a value of a current flowing through the second switch portion in an on-state based on the value of the input voltage,
   wherein the first switch portion includes a plurality of first switch elements provided in series with the respective first resistor elements,
   wherein the second switch portion includes a plurality of second switch elements provided in-series with the respective second resistor elements, and
   wherein, based on the value of the input voltage, the control unit controls which one of the first switch elements is turned on when the first switch portion is in the on-state and also controls which one of the second switch elements is turned on when the second switch portion is in the on-state.

2. The DC-DC converter according to claim 1, wherein, when the value of the input voltage is larger than a first predetermined value, the control unit performs control in such a manner that the value of the current flowing through the first switch portion in the on-state is smaller than that when the value of the input voltage is equal to or smaller than the first predetermined value.

3. The DC-DC converter according to claim 2, wherein, when the value of the input voltage is larger than a second predetermined value larger than the first predetermined value, the control unit performs control in such a manner that the value of the current flowing through the first switch portion in the on-state is smaller than that when the value of the input voltage is larger than the first predetermined value and is equal to or smaller than the second predetermined value.

4. The DC-DC converter according to claim 1, wherein the first switch portion includes a plurality of first MOS transistors provided in parallel between the input terminal and the output terminal, and
   wherein the control unit controls the number of ones of the first MOS transistors, which are turned on when the first switch portion is in the on-state, based on the value of the input voltage.

5. The DC-DC converter according to claim 1, wherein, when the value of the input voltage is larger than a first predetermined value, the control unit performs control in such a manner that both the value of the current flowing through the first switch portion in the on-state and the value of the current flowing through the second switch portion in the on-state are smaller than those when the value of the input voltage is equal to or smaller than the first predetermined value.

6. The DC-DC converter according to claim 5, wherein, when the value of the input voltage is larger than a second predetermined value larger than the first predetermined value, the control unit performs control in such a manner that both the value of the current flowing through the first switch portion in the on-state and the value of the current flowing through the second switch portion in the on-state are smaller than those when the value of the input voltage is larger than the first predetermined value and is equal to or smaller than the second predetermined value.

7. The DC-DC converter according to claim 1, wherein the first switch portion includes a plurality of first MOS transistors provided in parallel between the input terminal and the output terminal,
   wherein the second switch portion includes a plurality of second MOS transistors provided in parallel between the reference voltage terminal and the output terminal, and
   wherein the control unit controls the number of ones of the first MOS transistors, which are turned on when the first switch portion is in the on-state, and the number of ones of the second MOS transistors, which are turned on when the second switch portion is in the on-state, based on the value of the input voltage.

8. The DC-DC converter according to claim 1,
wherein the pulse signal generation unit generates the pulse signal with a pulse width corresponding to a value of the output voltage.

9. The DC-DC converter according to claim 8,
wherein the control unit controls the value of the current flowing through the first switch portion in the on-state based on the value of the input voltage and also based on at least either of a temperature of the voltage conversion unit and a process variation of the voltage conversion unit.

10. A wireless communication device comprising:
the DC-DC converter according to claim 1 that generates the output voltage in accordance with the input voltage;
a demodulation unit that operates by supply of the output voltage to demodulate a high-frequency signal wirelessly received from outside to a baseband signal, and
a baseband signal processing unit that performs a predetermined process based on the baseband signal.

11. The wireless communication device according to claim 10,
wherein the control unit controls the value of the current flowing through the first switch portion in the on-state to become maximum when no integral multiple of a frequency of the pulse signal is included in a frequency band of the high-frequency signal wirelessly received from the outside.

\* \* \* \* \*